(12) United States Patent
Ruzzene et al.

(10) Patent No.: US 8,286,490 B2
(45) Date of Patent: Oct. 16, 2012

(54) ARRAY SYSTEMS AND RELATED METHODS FOR STRUCTURAL HEALTH MONITORING

(75) Inventors: Massimo Ruzzene, Smyrna, GA (US); Stefano Gonella, Evanston, IL (US); Nicole Apetre, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 388 days.

(21) Appl. No.: 12/638,315

(22) Filed: Dec. 15, 2009

(65) Prior Publication Data
US 2010/0206080 A1 Aug. 19, 2010

Related U.S. Application Data

(60) Provisional application No. 61/122,917, filed on Dec. 16, 2008.

(51) Int. Cl.
*G01N 29/04* (2006.01)
(52) U.S. Cl. ............................................. 73/618; 73/596
(58) Field of Classification Search .................. 73/618, 73/596, 579, 597, 620, 625–628, 633, 640, 73/645–648; 702/35, 36, 39, 159
See application file for complete search history.

(56) References Cited

U.S. PATENT DOCUMENTS

| | | | |
|---|---|---|---|
| 4,213,344 A | 7/1980 | Rose | |
| 5,511,550 A * | 4/1996 | Finsterwald | 600/459 |
| 5,550,792 A | 8/1996 | Crandall | |
| 5,692,029 A | 11/1997 | Husseiny et al. | |
| 6,006,163 A | 12/1999 | Lichtenwalner | |
| 6,279,397 B1 | 8/2001 | Dwyer | |
| 6,339,939 B1 * | 1/2002 | Chen | 62/646 |
| 6,370,964 B1 * | 4/2002 | Chang et al. | 73/862.046 |
| 6,996,480 B2 | 2/2006 | Giurgiutiu | |
| 7,387,033 B2 | 6/2008 | Qing | |
| 7,405,512 B2 | 7/2008 | Pannell | |
| 7,406,220 B1 | 7/2008 | Christensen | |
| 7,414,577 B2 | 8/2008 | Mohamadi | |
| 7,417,706 B2 | 8/2008 | Holmes | |
| 7,428,842 B2 | 9/2008 | Fair | |
| 7,432,859 B2 | 10/2008 | Zinanti | |
| 7,836,768 B2 * | 11/2010 | Young et al. | 73/620 |
| 7,881,881 B2 * | 2/2011 | Giurgiutiu et al. | 702/39 |
| 7,917,311 B2 * | 3/2011 | Finkel et al. | 702/39 |
| 2006/0097942 A1 | 5/2006 | Tanaka et al. | |
| 2007/0175279 A1 * | 8/2007 | Beard et al. | 73/584 |

OTHER PUBLICATIONS

Modeling and Testing of PZT and PVDF Piezoelectric Wafer Active Sensors; B Lin and V Giurgiutiu; pp. 1085-1093; Institute of Physics Publishing; Smart Mater. Struct. 15 (2006).
Review of In-Situ Fabrication Methods of Piezoelectric Wafer Active Sensor for Sensing and Actuation Applications; Bin Lin, Victor Giurgiutiu; Mechanical Engineering Department, University of South Carolina; pp. 1-12;.Paper # 5764-04.

(Continued)

*Primary Examiner* — J M Saint Surin
(74) *Attorney, Agent, or Firm* — Thomas, Kayden, Horstemeyer & Risley, LLP.

(57) ABSTRACT

Systems and related methods for structural health monitoring are provided. In this regard, a representative array system includes: a component to be monitored; and an array system mounted to the component, the array system has multiple array components exhibiting spatial periodicity, the array components being operative to produce waves with frequency dependent directional characteristics, which propagate through the component, responsive to simultaneous activation of the array components.

20 Claims, 18 Drawing Sheets

OTHER PUBLICATIONS

Omni-Directional Guided Wave Transducer Arrays for the Rapid Inspection of Large Areas of Plate Structures; Paul D. Wilcox; IEEE Transactions on Ultrasonics, Ferroelectrics, and Frequency Control, vol. 50, No. 6, Jun. 2003; pp. 699-709.

On the Development and Testing of a Guided Ultrasonic Wave Array for Structural Integrity Monitoring; Paul Fromme, Paul D. Wilcox, Michael J. S. Lowe and Peter Cawley, Member IEEE; IEEE Transactions on Ultrasonics, Ferroelectrics, and Frequency Control, vol. 53, No. 4, Apr. 2006; pp. 777-785.

Using Phased Array Technology and Embedded Ultrasonic Structural Radar for Active Structural Health Monitoring and Nondestructive Evaluation; Lingyu Yu, PHD Candidate, Victor Giurgiutiu, Professor; Proceedings of IMECE 2005: 2005 ASME International Mechanical Engineering Congress Nov. 5-13, Orlando, Florida; pp. 1-8.

A Comb Transducer Model for Guided Wave NDE; J.L. Rose, S.P. Pelts, M.J. Quarry; Ultrasonics 36 (1998) pp. 163-169.

Ultrasonic Arrays for Non-Destructive Evaluation: A Review; Bruce W. Drinkwater, Paul D. Wilcox; NDT&E International 39 (2006) pp. 525-541.

Finite-Dimensional Piezoelectric Transducer Modeling for Guided Wave Based Structural Health Monitoring; Ajay Raghavan and Carols E S Cesnik; Institute of Physics Publishing; Smart Mater. Struct. 14 (2005) pp. 1448-1461.

Lamb Wave Generation and Reception with Time-Delay Periodic Linear Arrays; A BEM Simulation and Experimental Study; Wenhao Zhu and Joseph L. Rose; IEEE Transactions on Ultrasonics, Ferroelectrics, and Frequency Control, vol. 46, No. 3, May 1999; pp. 654-664.

Modeling and Testing of PZT and PVDF Piezoelectric Wafer Active Sensors; B Lin and V Giurgiutiu; Institute of Physics Publishing; Smart Mater. Struct. 15 (2006) pp. 1085-1093.

Implementing Guided Wave Mode Control by Use of a Phased Transducer Array; Jian Li and Joseph L. Rose; IEEE Transactions on Ultrasonics, Ferroelectrics, and Frequency Control, vol. 48, No. 3, May 2001; pp. 761-768.

International Search Report and Written Opinion for PCT/US2009/068209. Mar. 31, 2010.

* cited by examiner

ARRAY SYSTEMS AND RELATED METHODS FOR STRUCTURAL HEALTH MONITORING

CROSS REFERENCE TO RELATED APPLICATIONS

This utility application claims the benefit of and priority to U.S. Provisional Application 61/122,917, which was filed on Dec. 16, 2008, and which is incorporated by reference herein in its entirety.

STATEMENT REGARDING FEDERALLY SPONSORED RESEARCH AND DEVELOPMENT

This invention was made with support from the U.S. government under grant number: 0800263, awarded by the National Science Foundation. The Government has certain rights in the invention.

BACKGROUND

1. Technical Field

The disclosure generally relates to structural health monitoring and non-destructive evaluation.

2. Description of the Related Art

The effective interrogation of the health of a structural component often requires sensors and actuators with the ability to perform directional scanning. This enhances the sensitivity of the inspection and simplifies the determination of the location of damage.

In this regard, the application of piezoelectric phased arrays for guided waves-based structural health monitoring has been investigated. However, a perceived underlying limitation of such monitoring is associated with the need to excite array components individually, which involves hardware and/or software complexity.

SUMMARY

Systems and related methods for structural health monitoring are provided. An exemplary embodiment of an array system for performing structural health monitoring of a component comprises: multiple array components exhibiting spatial periodicity; the array components being operative in at least one of: an actuator mode and a sensor mode such that: in the actuator mode, simultaneous activation of the array components produces waves with frequency dependent directional characteristics that propagate through the component; and in the sensor mode, the array components detect waves propagated through the component.

An exemplary embodiment of a structural health monitored system comprises: a component to be monitored; and an array system mounted to the component, the array system comprising multiple array components exhibiting spatial periodicity, the array components being operative to produce waves with frequency dependent directional characteristics, which propagate through the component, responsive to simultaneous activation of the array components.

An exemplary embodiment of a method for performing structural health monitoring of a component comprises: simultaneously activating multiple array components exhibiting spatial periodicity, with a control signal propagated via a single channel, to produce waves with frequency dependent directional characteristics that propagate through the component.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Array systems and related methods for structural health monitoring are provided, several exemplary embodiments of which will be described in detail. In some embodiments, beam steering of energy propagated from an array is achieved by exploiting interference phenomena (i.e., constructive and/or destructive interference) generated by spatial periodicity of the array and the simultaneous activation of its components. Such interference phenomena produce waves with frequency dependent directional characteristics, which allow directional scanning to be performed simply through a frequency sweep. As such, the need for beam-forming algorithms and associated hardware may be avoided. In addition, spatially periodic piezoelectric actuators used in some embodiments can be exploited for tuning the excitation to a specific wave mode and, therefore, may be able to combine mode tuning with beam steering capabilities in a single device.

Figure 1A:
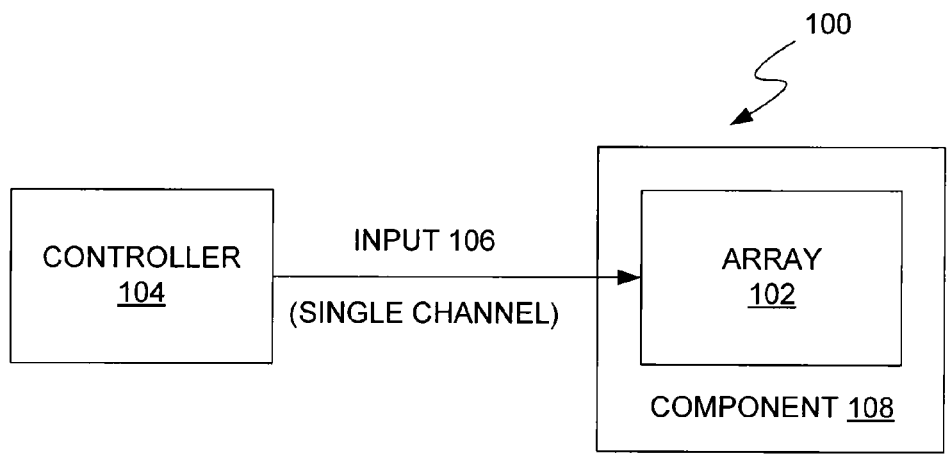
FIG. 1A is a schematic diagram depicting an exemplary embodiment of an array system.

In this regard, FIG. 1A is a schematic diagram depicting an exemplary embodiment of an array system. As shown in FIG. 1A, system 100 includes an array 102, a controller 104 and an input 106, which in this case is a single channel for providing a control signal. The array incorporates a set of array components (e.g., piezoelectric actuators, acoustic sources, electromagnetic actuators, among others—not shown in FIG. 1A), an exemplary configuration of which will be described later. It should be noted that the array is mounted (e.g., surface mounted) to a component 108 on which health monitoring is to be performed. Structural components to be inspected include, but are not limited to, aircraft parts (such as wing spars, longerons and control surfaces), and load carrying parts of bridges and buildings.

In operation, controller 104 provides a control signal to the array components of array 102 via input 106. Responsive to the signal, the array components propagate waves through the material of component 108. Spatial periodicity of the array and the simultaneous activation of the array components permit interference phenomena to produce waves with frequency dependent directional characteristics. This allows component 108 to be directionally scanned by sweeping the frequency of actuation of the array components in response to the control signal.

Figure 1B:
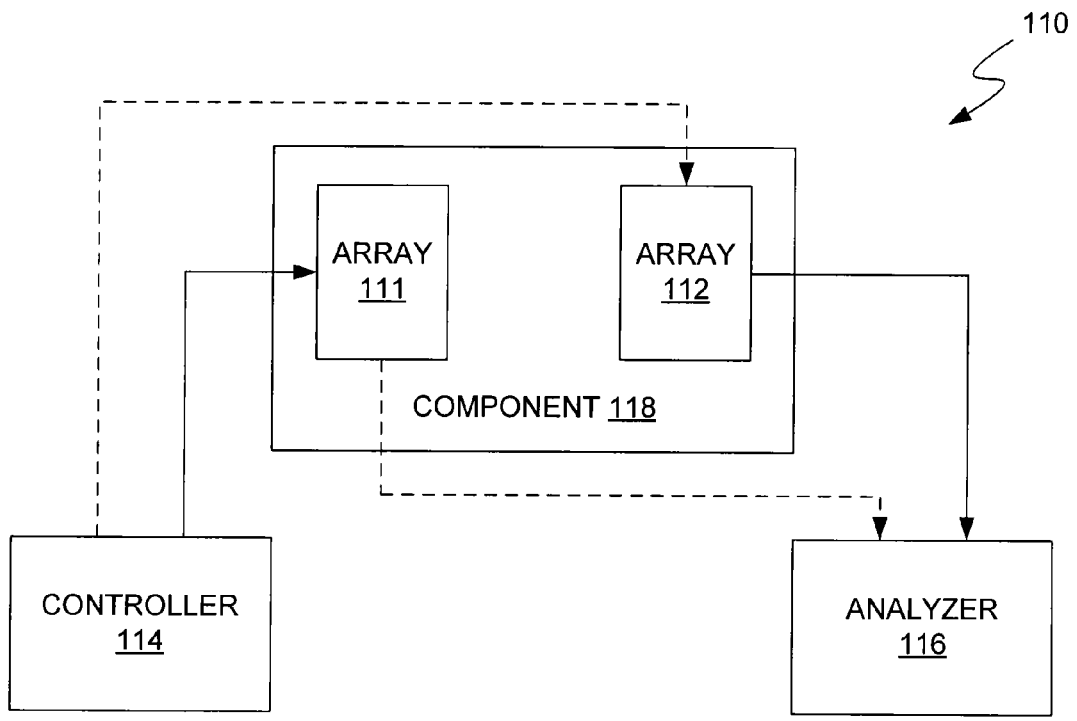
FIG. 1B is a schematic diagram depicting another exemplary embodiment of an array system.

FIG. 1B is a schematic diagram depicting another exemplary embodiment of an array system. As shown in FIG. 1B, system 110 includes two sets of arrays (111, 112), a controller 114 and an analyzer 116. Each of the arrays incorporates a set of array components (not shown in FIG. 1B), with the arrays (111, 112) being spaced from each other and mounted to a component 118 on which health monitoring is to be performed.

In operation, controller 114 provides a control signal to the array components of array 111. In an actuator (active) mode, the array components of array 111 propagate waves through the component 118 responsive to the control signal. Spatial periodicity of the array and the simultaneous activation of the array components permit interference phenomena to produce waves with frequency dependent directional characteristics. This allows component 118 to be directionally scanned by sweeping the frequency of actuation of the array components in response to the control signal.

In this embodiment, the array components of array 112 operate in a sensor (passive) mode. In the sensor mode, the array components detect waves propagated through the component, such as for impact detection. The detected waves are converted by the array components to signals that are processed by analyzer 116. The analyzer exploits the correspondence between the array directivity angles and frequency. For example, by correlating the array maximum response frequency with the directivity angle, the analyzer may be able to triangulate the impact location, i.e., the source of the detected waves.

It should be noted that, in other embodiments, an array can be operated selectively in the actuator or sensor mode. Such a configuration is depicted by the dashed lines in FIG. 1B, in which array 111 is additionally communicatively coupled to analyzer 116, and array 112 is additionally communicatively coupled to controller 114. This configuration enables array 111 to operate in the actuator mode while array 112 operates in sensor mode and, alternatively, array 111 can operate in the sensor mode while array 112 operates in the actuator mode. Clearly, various other configurations involving additional arrays, controllers and/or analyzers can be used in other embodiments.

The concept of directional scanning through frequency sweep of an array is first illustrated for the case of SV waves (i.e., shear waves polarized in a vertical plane) in a membrane-like medium, which can be treated through a simple mathematical formulation and does not introduce the complexity associated with multi-modal generation and propagation. Notably, the concept can be illustrated for the case of SV waves propagating in an isotropic, two-dimensional elastic medium, which is excited by a generic loading distribution. The governing equation is:

$$\mu \nabla^2 u_3 + F_3 = \rho \ddot{u}_3 \qquad (1)$$

where $\mu$, $\rho$ respectively denote the shear modulus and the density of the domain, $u_3 = u_3(x_1, x_2, t)$, and $\nabla^2 = \partial^2/\partial x_1^2 + \partial^2/\partial x_2^2$. Also, in equation (1) $F_3 = F_3(x_1, x_2, t)$ defines the loading distribution, with $x_1, x_2$ denoting the plane of the structure. Under the assumption of harmonic load at frequency $\omega F_3(x_1, x_2, t) = F_3(x_1, x_2, \omega) e^{-i\omega t}$, equation (1) becomes:

$$\nabla^2 u_3 - k^2 u_3 = -f_3 \qquad (2)$$

where $k^2 = \omega^2/c_s^2$ is the wavenumber, $c_s^2 = \mu/\rho$ is the phase velocity of the SV waves, and $u_3(x_1, x_2, t) = u_3(x_1, x_2, \omega) e^{-i\omega t}$ and $f_3 = F_3/\mu$.

The solution of equation (2) can be formally obtained through the application of the two-dimensional Fourier Transform (FT) to displacements and force distribution. Application of the FT to equation (2) leads to:

$$(\xi_1^2 + \xi_2^2 - k^2)\hat{u}_3 = \hat{f}_3 \qquad (3)$$

which can be solved in terms of the unknown displacement transform, to obtain:

$$\hat{u}_3(\xi_1, \xi_2, \omega) = \frac{\hat{f}_3(\xi_1, \xi_2, \omega)}{\xi_1^2 + \xi_2^2 - k^2} \qquad (4)$$

This relation illustrates how the displacement amplitudes appear dependent upon two main factors: (1) the structure's behavior, and (2) the actuator's behavior as a function of the excitation frequency. Following the approach described by Li, J. and Rose, J. in "Implementing guided wave mode control by use of a phased transducer array," *IEEE Transactions on Ultrasonics, Ferroelectrics and Frequency Control*, Vol. 48 (3), 2001, pp. 761-8, the transformed displacement can be expressed in the following general form:

$$\hat{u}_3(\xi_1, \xi_2, \omega) = \blacklozenge^{-1}(\xi_1, \xi_2, \omega) \hat{f}_3(\xi_1, \xi_2, \omega) \qquad (5)$$

where $\blacklozenge(\xi_1, \xi_2, \omega)$ explicitly denotes the contribution of the structure under consideration. The response of more complex structures due to a generic surface force distribution can be represented in the same form, whereby the expression of $\blacklozenge(\xi_1, \xi_2, \omega)$ is defined by the differential operator corresponding to the governing equation of the medium under consideration. Equation (5) also indicates that maximum displacement amplitudes are obtained for excitation frequencies ω whose corresponding wavenumber k maximizes both $\Phi^{-1}(\xi_1, \xi_2, \omega)$ and $\hat{f}_3(\xi_1, \xi_2, \omega)$. The first term is maximized when:

$$\Phi(\xi_1, \xi_2, \omega) = 0 \quad (6)$$

which corresponds to the dispersion relation of the domain under consideration, in this case $\Phi(\xi_1, \xi_2, \omega) = \xi_1^2 + \xi_2^2 - k^2$. In conclusion, the maximum output is obtained at the wavenumber, and associated frequency, corresponding to the intersection between the medium's dispersion relation, and the locus in the $\xi_1, \xi_2$ plane defining the maximum of $\hat{f}_3(\xi_1, \xi_2, \omega)$.

The concept described above can be illustrated through the application of the analysis to the simple case of a two-dimensional (2D) periodic array of point sources. The force distribution in this case is expressed as:

$$f(x_1, x_2, \omega) = f_0(\omega) \sum_{n=-N}^{N} \sum_{m=-M}^{M} \delta(x_1 - nd_1) \delta(x_2 - md_2) \quad (7)$$

where, $f_0(\omega)$ denotes the amplitude of the excitation at frequency ω, 2N+1, 2M+1 respectively define the number of sources along the $x_1, x_2$ directions, while $d_1, d_2$ denote the spacings, or the periods, of the array in the two directions. Application of the 2D FT in space yields:

$$\hat{f}(\xi_1, \xi_2, \omega) = f_0 \sum_{n=-N}^{N} \sum_{m=-M}^{M} e^{in\xi_1 d_1} e^{im\xi_2 d_2} \quad (8)$$

whose expression can be simplified to obtain:

$$\hat{f}(\xi_1, \xi_2, \omega) = f_0 \frac{\sin\left(\frac{(2N+1)\xi_1 d_1}{2}\right)}{\sin\left(\frac{\xi_1 d_1}{2}\right)} \frac{\sin\left(\frac{(2M+1)\xi_2 d_2}{2}\right)}{\sin\left(\frac{\xi_2 d_2}{2}\right)} \quad (9)$$

This expression is maximized when:

$$\xi_{1_p} = p\frac{2\pi}{d_1}, \xi_{2_q} = q\frac{2\pi}{d_2} \quad (10)$$

where p,q are integers. Equation (10) identifies a pair of values in wavenumber space, whose substitution in the dispersion relation for the medium identifies a corresponding value of frequency:

$$\omega_{p,q}^M = 2\pi c_s \sqrt{\left(\frac{p}{d_1}\right)^2 + \left(\frac{q}{d_2}\right)^2} \quad (11)$$

which in turn defines preferential directions of radiation for the source array. In fact, letting $\xi_1 = \xi \cos\theta$ and $\xi_2 = \xi \sin\theta$, with θ defining the direction of the wave vector ξ, and taking the ratio of the two equations (10), provides a value for the maximum direction corresponding to excitation at frequency $\omega_{p,q}^M$. This expression is:

$$\tan(\theta_{p,q}) = \frac{qd_1}{pd_2} \quad (12)$$

Equations (10) and (12) show that proper selection of the frequency of excitation of the array components can be exploited to achieve preferential radiation of the array in directions which are defined by the periodicity $d_1, d_2$ and by the selected integers' pair p,q. The directionality of the array can be expressed as:

$$d(\theta, p, q) = \frac{\sin(\pi \Omega_{p,q} \cos\theta(2N+1))}{\sin(\pi \Omega_{p,q} \cos\theta)} \frac{\sin(\pi \Omega_{p,q} \sin\theta(2M+1))}{\sin(\pi \Omega_{p,q} \sin\theta)} \quad (13)$$

where $\Omega_{p,q}$ defines a non-dimensional values of frequency: $\Omega_{p,q} = \omega_{p,q} d_1 / 2\pi c_s$.

Figure 1C:
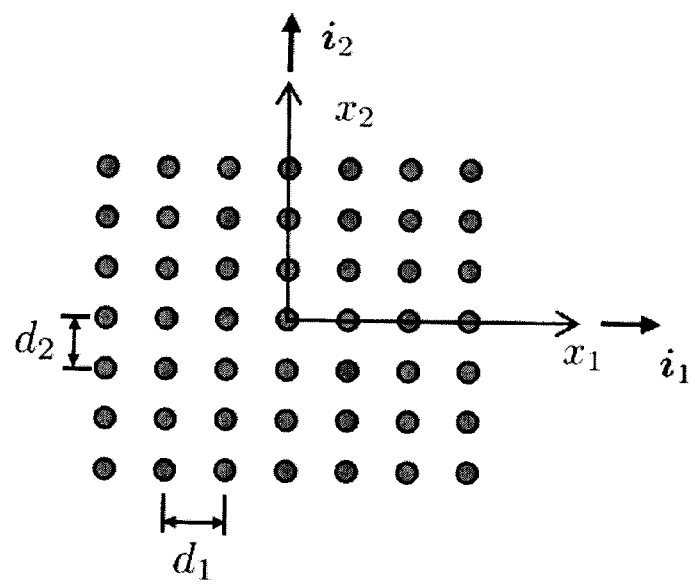
FIG. 1C is a schematic diagram depicting an exemplary embodiment of an array system, showing detail of the configuration of the array components.

This concept and its implication to the design of actuators with frequency-dependent directionality is illustrated by considering FIG. 1C, which depicts an exemplary embodiment of an array. As shown in FIG. 1C, the array comprises a 7×7 array of point sources with normalized periods $d_1/c_s=0.5$ and $d_2/c_s=0.4$.

Figure 2A:
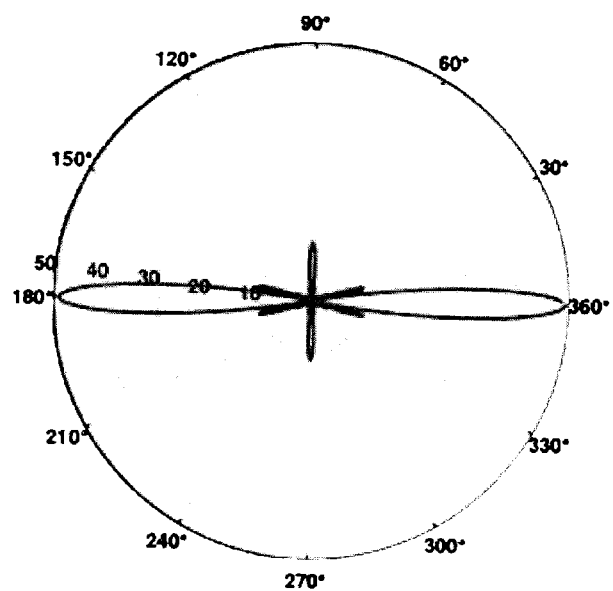
FIGS. 2A-2C are directionality plots for various values of integer pairs and corresponding frequencies associated with the array of FIG. 1C.
Figure 2B:
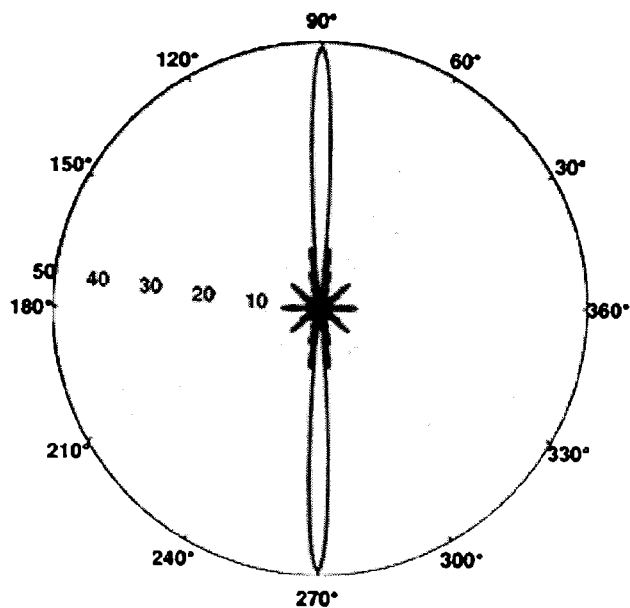
Figure 2C:
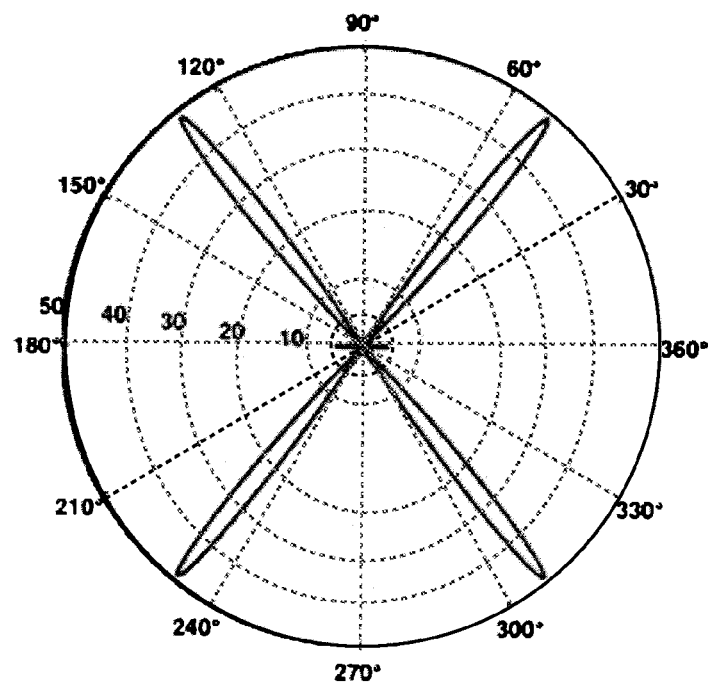

As explicitly indicated, the directionality of the array depends on the excitation frequency, which in turn is defined by the integer pair p,q according to equation (11). Examples of directionality plots for various values of integer pairs and corresponding frequencies are presented in FIGS. 2A-2C. Notably, in FIG. 2A $\Omega_{p,q}=2\pi$, $\theta_{p,q}=0°$, 180°, in FIG. 2B $\Omega_{p,q}=2.5\pi$, $\theta_{p,q}=\pm 90°$, and in FIG. 2C $\Omega_{p,q}=3.22\pi$, $\theta_{p,q}=\pm 51°$, 128°.

The results show how the selection of the excitation frequency can be used to obtain different directional characteristics of the array. In particular, simultaneous excitation of all the array components at $\Omega_{p,q}=2\pi$, $2.5\pi$ produces strong radiations respectively along the horizontal and vertical directions, while excitation at $\Omega_{p,q}=3.2\pi$ corresponds to main lobes at $\theta_{p,q}=\pm 51°$ and $\theta_{p,q}=128°$. This last result shows how design of the array could include considerations which reduce the number of lobes appearing for a given value of the excitation frequency, so that desired scanning capabilities can be achieved.

The predictions obtained through the analysis of the dispersion relations and their intersection with the loci of maximum actuator output can be validated with the response of the considered domain computed for the considered excitation frequencies. The expression for the wavefield generated by the source array can be obtained analytically through a straightforward extension of the formulation for the single point source presented in K. Graff, "Wave Motion in Elastic Solids", Dover, 1975. The displacement at location $x_1, x_2$ due to a point force at location $x_{1_n}, x_{2_m}$ of amplitude $f_0$ and frequency ω can be expressed as:

$$u_3(r, \omega) = f_0 \Phi(r, r_{n,m}, \omega) \quad (14)$$

where $r = x_1 i_1 + x_2 i_2$ is a vector defining the response location, $r_{n,m} = x_{1_n} i_1 + x_{2_m} i_2$ is the source location, and $\Phi$ the Green's function defining the response to a unit source, which is given by:

$$\Phi(r, r_{n,m}, \omega) = \int_{-\infty}^{+\infty} \int_{-\infty}^{+\infty} \frac{e^{-i[\xi_1(x_1-x_{1_n})+\xi_2(x_2-x_{1_m})]}}{\xi_1^2 + \xi_2^2 - k^2} dx_1 dx_2 \quad (15)$$

which upon integration gives:

$$\Phi(r, r_{n,m}, \omega) = i\pi^2 H_0^{(1)}(kR) \quad (16)$$

where $H_0^{(1)}$ is the Hankel function of the first kind and order 0, while $R=|r-r_{n,m}|$ denotes the distance between source and point under consideration. Equation (14) can be readily extended to superimpose the effects of the various sources of the array. This gives:

$$u_3(r,\omega) = f_0(\omega) \sum_{n=1}^{N} \sum_{m=1}^{M} \Phi(r, r_{n,m}, \omega) \quad (17)$$

Figure 3A:
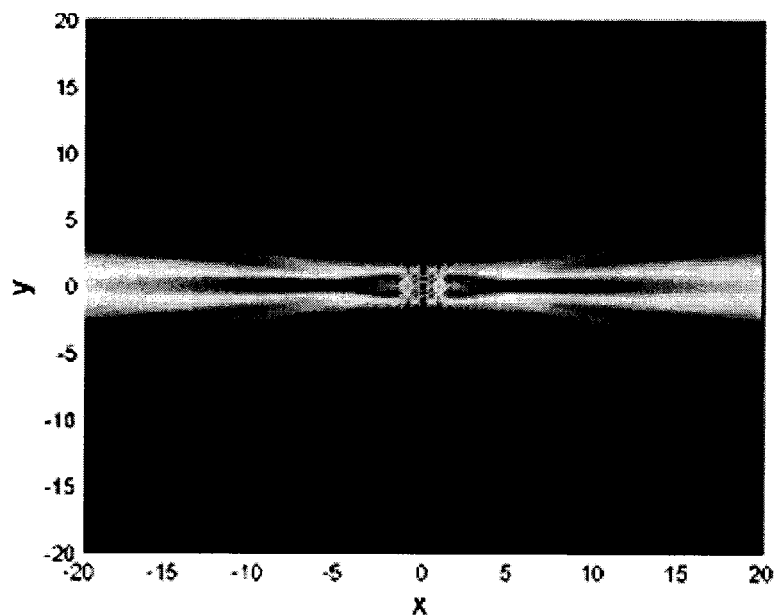
FIGS. 3A-3C are diagrams depicting estimated response amplitudes, which confirm the prediction regarding directionality of the array of FIG. 1C and its frequency dependency.
Figure 3B:
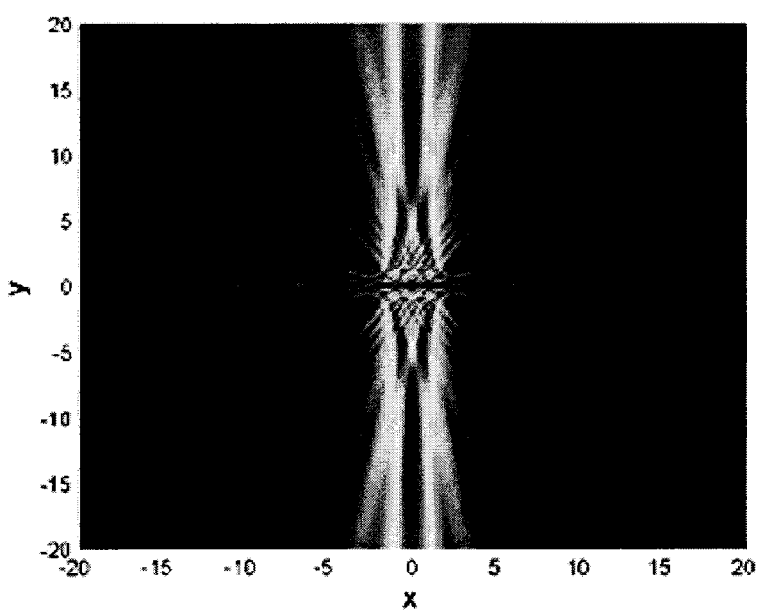
Figure 3C:
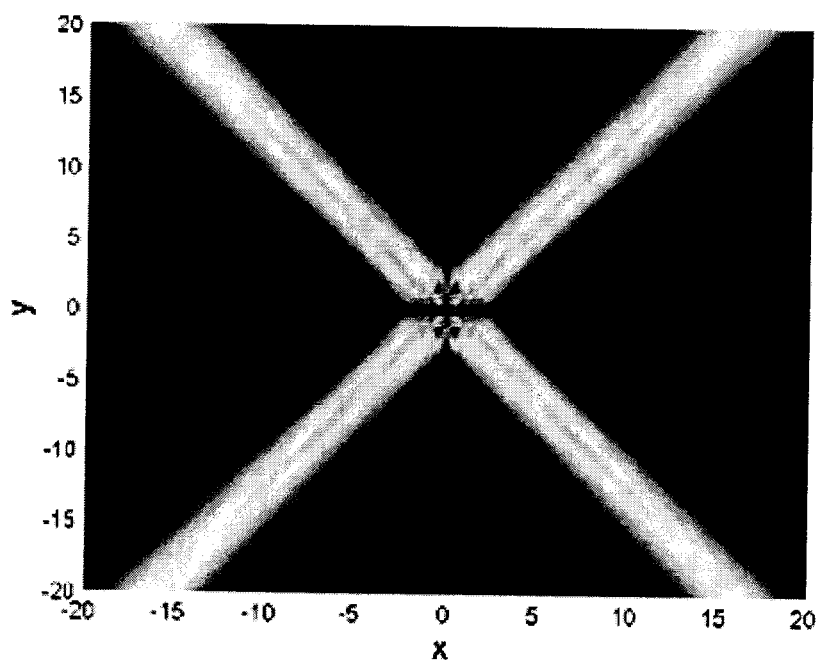

Equation (17) is applied to evaluate the response of the domain when the array is excited at the frequency values considered in the previous section. The estimated response amplitudes are shown in FIGS. 3A-3C, which confirm the prediction regarding directionality of the actuator array and its frequency dependency. Notably, in FIG. 3A $\Omega_{p,q}=2\pi$, $\theta_{p,q}=0°, 180°$, in FIG. 3B $\Omega_{p,q}=2.5\pi$, $\theta_{p,q}=\pm 90°$, and in FIG. 3C $\Omega_{p,q}=3.2\pi$, $\theta_{p,q}=\pm 51°, 128°$.

Figure 4:
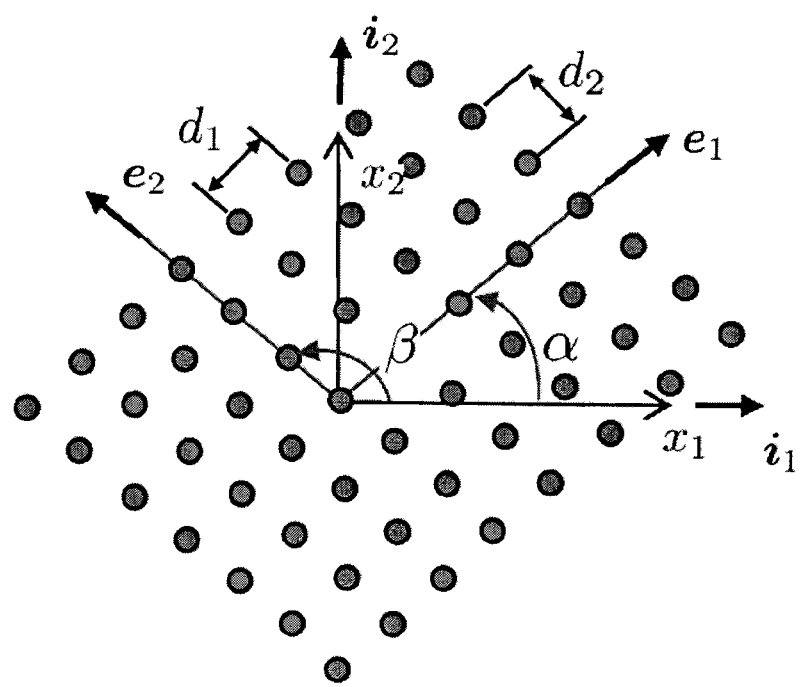
FIG. 4 is a schematic diagram illustrating an exemplary embodiment of a quadrilateral array.

The basic configuration presented above can be modified, for example, through a simple change in coordinates, through which the frequency dependent directionality of the actuator can be improved. The objective is to increase the number of combinations of in-plane wavenumbers and corresponding frequencies which uniquely define a preferential direction of radiation for the actuator. The discussion presented in the previous section can be generalized by considering an array of sources located according to a quadrilateral topology defined by the unit vectors $e_1, e_2$, the associated angles $\alpha, \beta$, and the periods $d_1, d_2$. A schematic diagram illustrating an exemplary embodiment of a quadrilateral array is presented in FIG. 4.

The corresponding force distribution can be expressed as:

$$f(x_1, x_2, \omega) = f_0(\omega) \sum_{n=-N}^{N} \sum_{m=-M}^{M} \delta(x_1-x_{1_{n,m}})\delta(x_2-x_{2_{n,m}}) \quad (18)$$

where $x_{1_{n,m}}, x_{2_{n,m}}$ denote the coordinates of the n,m-th actuator of the array. The spatial FT of the force distribution defined in equation (18) is given by:

$$\hat{f}(\xi_1, \xi_2, \omega) = f_0(\omega) \sum_{n=-N}^{N} \sum_{m=-M}^{M} e^{ind_1(\xi_1\cos\alpha+\xi_2\sin\alpha)} e^{imd_2(\xi_1\cos\beta+\xi_2\sin\beta)} \quad (19)$$

which can be simplified as follows:

$$\hat{f}(\xi_1, \xi_2, \omega) = f_0(\omega) \frac{\sin((2N+1)d_1(\xi_1\cos\alpha+\xi_2\sin\alpha))}{\sin(d_1(\xi_1\cos\alpha+\xi_2\sin\alpha))} \times \quad (20)$$

$$\frac{\sin((2M+1)d_2(\xi_1\cos\beta+\xi_2\sin\beta))}{\sin(d_2(\xi_1\cos\beta+\xi_2\sin\beta))}$$

The wavenumber values which maximize the actuators output are obtained as solutions for the following system of algebraic equations defined by a selected integer pair p,q:

$$\xi_1\cos\alpha + \xi_2\sin\alpha = \frac{2p\pi}{d_1}, \quad \xi_1\cos\beta + \xi_2\sin\beta = \frac{2q\pi}{d_2} \quad (21)$$

As before, the corresponding frequency $\omega_{p,q}$ is obtained upon substitution of the wavenumber values in the dispersion relation for the medium, which in this case gives:

$$\omega_{p,q} = 2\pi c_s \sqrt{(\xi_{1_{p,q}})^2 + (\xi_{2_{p,q}})^2} \quad (22)$$

Figure 6A:
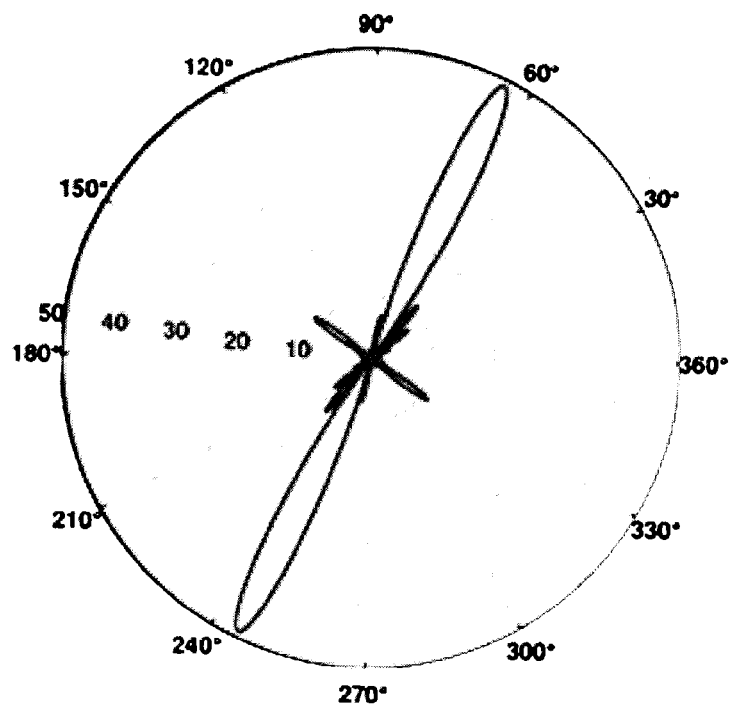
FIGS. 6A-6C are diagrams depicting the frequency-dependent directionality obtained through the periodic array topology of the array of FIG. 4.
Figure 6B:
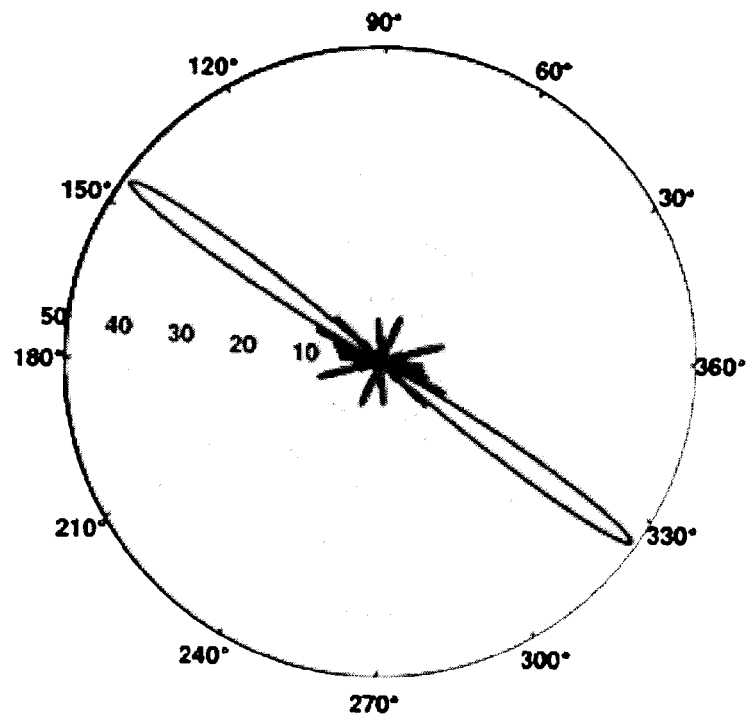
Figure 6C:
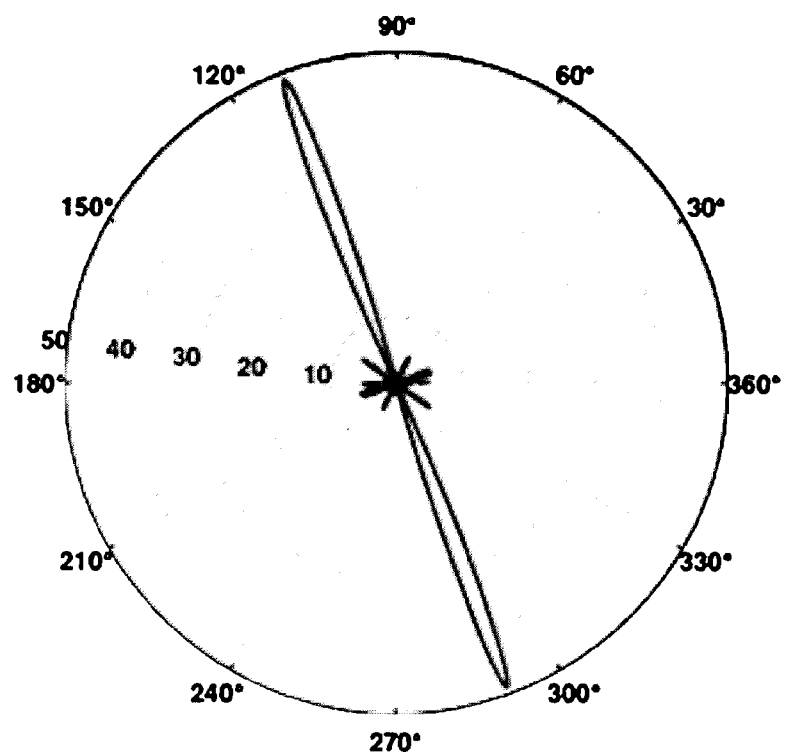
Figure 7A:
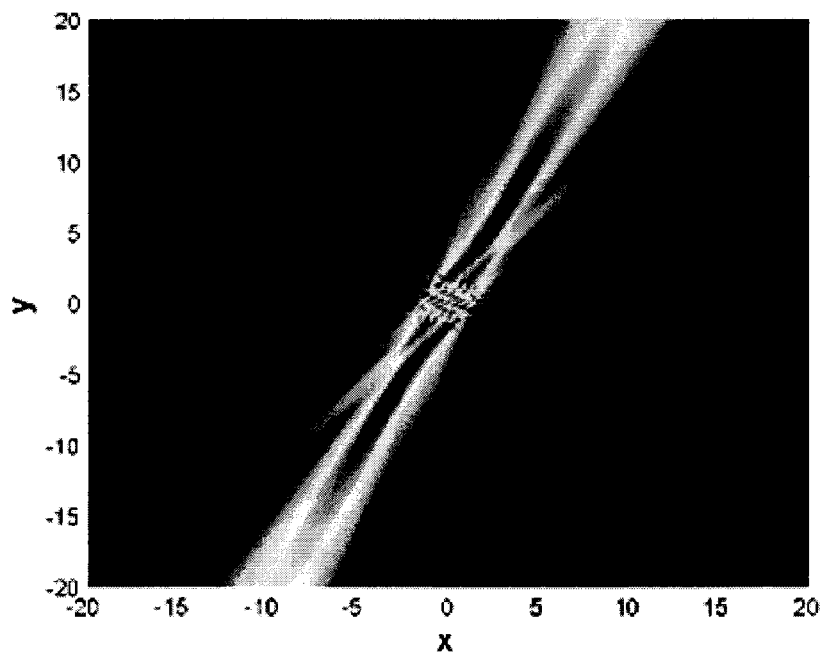
FIGS. 7A-7C are diagrams depicting the harmonic response of the array of FIG. 4 for selected frequencies.
Figure 7B:
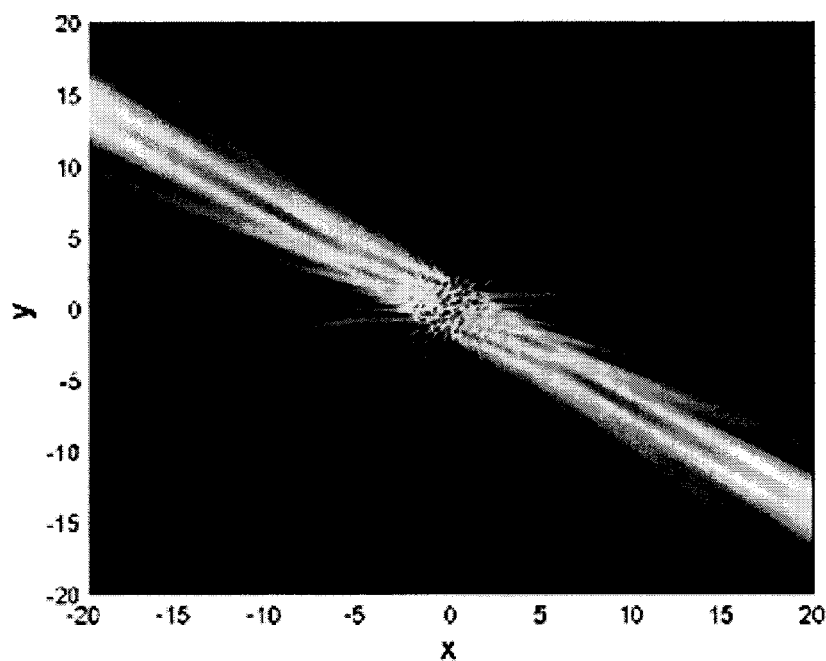
Figure 7C:
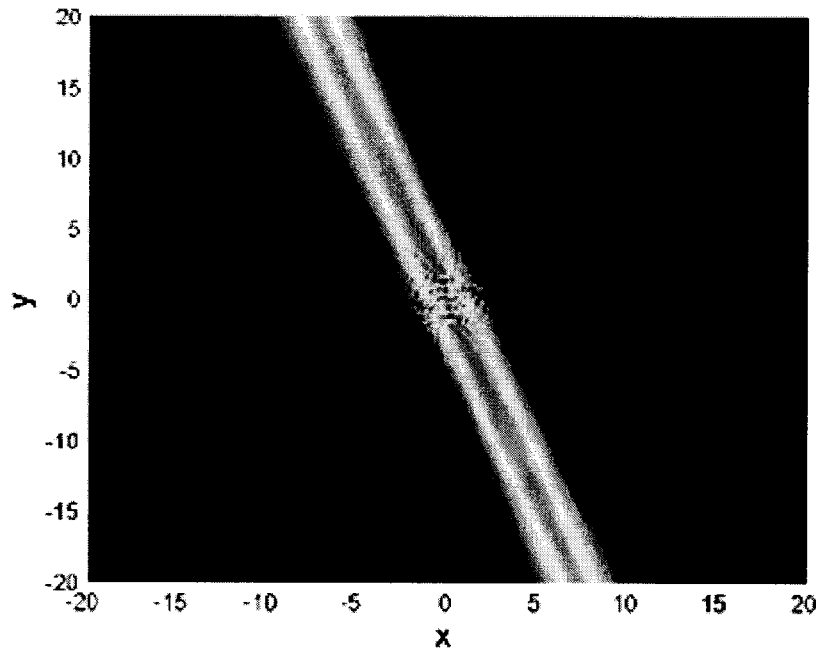

The directionality of the array corresponding to excitation at one the frequencies $\omega_{p,q}$ of maximum actuator output can be expressed as:

$$d(\theta, p, q) = \quad (23)$$

$$\frac{\sin(2\pi\Omega_{p,q}(2N+1)\cos(\theta-\alpha))}{\sin(2\pi\Omega_{p,q}\cos(\theta-\alpha))} \times \frac{\sin\left(2\pi\Omega_{p,q}(2M+1)\frac{d_2}{d_1}\cos(\theta-\alpha)\right)}{\sin\left(2\pi\Omega_{p,q}\frac{d_2}{d_1}\cos(\theta-\alpha)\right)}$$

where frequency is non-dimensionalized according to $\Omega = d_1\omega/c_s$. Results for an embodiment of a 7×7 array defined by the angles $\alpha=55°$ and $\beta=165°$ are shown in FIGS. 5-7.

Figure 5:
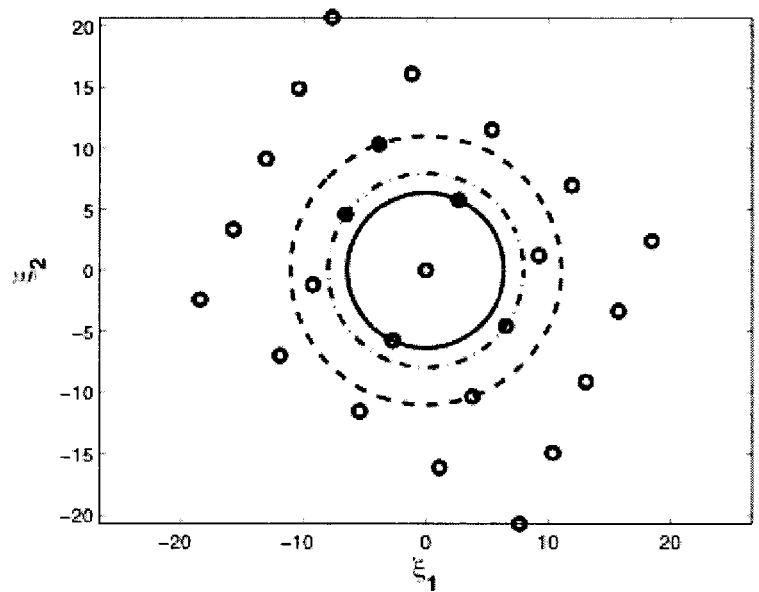
FIG. 5 is a diagram depicting the locations of the wavenumber maxima presented together with circles representing the cross-section of the dispersion relation for the array of FIG. 4 at selected frequencies.

In FIG. 5, the locations of the wavenumber maxima defined by equations (21) are presented together with circles representing the cross-section of the dispersion relation at the frequencies $\omega_{p,q}$ ($\Omega_{p,q}=1.01\pi$—solid line, $\Omega_{p,q}=1.26\pi$—dashed line, $\Omega_{p,q}=1.75\pi$—dash-dotted line). This representation graphically illustrates the concept under investigation, whereby the intersection between the dispersion relation at a given frequency with one of the maxima of the force distribution in wavenumber space leads to the maximum actuator output. Such intersection also defines a direction of preferential direction, which is given by $\tan(\theta_{p,q})=\xi_{2_{p,q}}/\xi_{1_{p,q}}$, where $\xi_{1_{p,q}}, \xi_{2_{p,q}}$ denote the wavevector components of maximum radiation, as defined by the solution of equations (21). Directionality plots corresponding to the frequency values highlighted in FIG. 5 are presented in FIGS. 6A-6C to illustrate the frequency-dependent directionality obtained through the periodic array topology. Notably, in FIG. 6A $\Omega_{p,q}=1.01\pi$, $\theta_{p,q}=65°$, in FIG. 6B $\Omega_{p,q}=1.26\pi$, $\theta_{p,q}=145°$, and in FIG. 6C $\Omega_{p,q}=1.75\pi$, $\theta_{p,q}=110°$. Also of note is the fact that the considered configuration, in contrast to the rectangular array design, leads to a broader set of combinations for which a single beaming angle is achieved. The directional behavior of the actuator array is verified through the estimation of the harmonic response of the medium subjected to the simultaneous excitation of all the array components. Examples of harmonic response computed through the procedure described in the previous section for selected frequencies are presented in FIGS. 7A-7C. Notably, in FIG. 7A $\Omega_{p,q}=1.01\pi$, $\theta_{p,q}=65°$, in FIG. 7B $\Omega_{p,q}=1.26\pi$, $\theta_{p,q}=145°$, and in FIG. 7C $\Omega_{p,q}=1.75\pi$, $\theta_{p,q}=110°$.

In the following, a general approach is used to obtain the directivity for arbitrary two-dimensional arrays. Consider a planar array mounted on the free surface of an elastic space.

Figure 8:
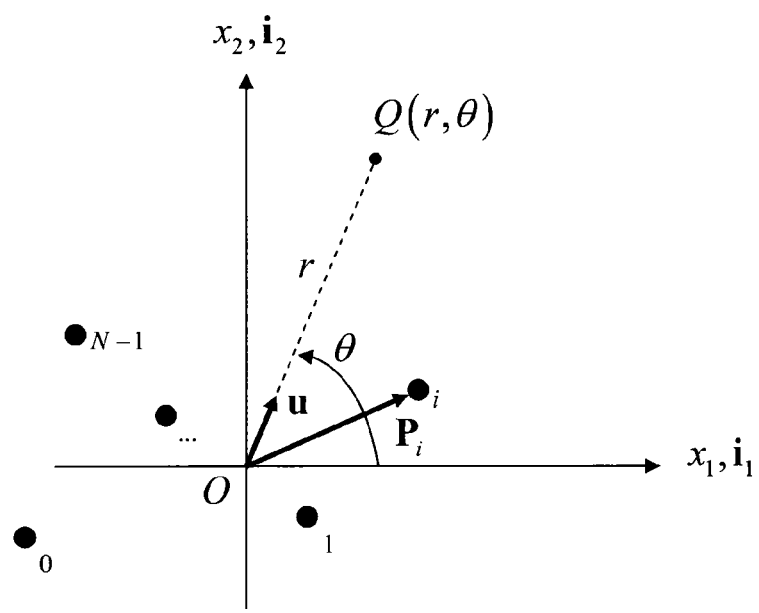
FIG. 8 is a schematic diagram of the notation and coordinate systems used in the mathematical formulation.

The array contains N elements, which all act as point sources. The considered configuration is depicted in FIG. 8, which is a schematic diagram of the notation and coordinate systems used in the mathematical formulation.

The following analysis is based on the following assumptions: each component acts as a point source, generating the same signal in the time domain denoted as g(t); the elastic space is homogeneous, isotropic, and it is described by plane-strain conditions. As a result, the medium sustains the propagation of two modes: a longitudinal (P) wave of phase speed $c_P$ and a shear (S) wave mode of speed $c_S$; and the analysis considers far-field radiation, so that each array component generates a wave that can be considered as plane around the point of interest.

The response at point $Q(r,\theta)$ due to the excitation of a hypothetical array component placed in the origin $O(0,0)$ can be expressed as:

$$w_i(r, \theta, t) = \frac{1}{r} g(t - \tau_0), \tag{24}$$

where the term $1/r$ introduces a spherical spreading loss factor related to the distance of the response point from the source. Also, $\tau_0$ denotes the propagation time from the source at $O(0,0)$ to $Q(r,\theta)$. Under the assumption that a single mode, say the P-mode, is propagating non-dispersively at speed $c_P$, the propagation time can be expressed as:

$$\tau_0 = \frac{r}{c_P}, \tag{25}$$

The response at Q due to the generic source i can be written as:

$$w_i(r, \theta, t) \approx \frac{1}{r} g(t - \tau_i), \tag{26}$$

where $\tau_i$ is the corresponding propagation time. With the far field assumption, $\tau_i$ can be expressed in terms of $\tau_0$ through a set of simple geometric considerations, which are based on the schematic configuration shown in FIG. 8. The far field assumptions assume that the waves generated by an actuator in $O(0,0)$ and another one in a generic i-position have essentially parallel wavefronts, and that the propagation distance only differs by a quantity which is related to the spacing between the two actuators. Hence the relation between $\tau_i$ and $\tau_0$ can be approximated as:

$$\tau_i = \frac{r + u^T P_i}{c_P} = \tau_0 + \frac{u^T P_i}{c_P} \tag{27}$$

where $u = u(\theta) = [\cos\theta \; \sin\theta]^T$ is the direction cosines vector of the point Q, and $P_i = [x_{1_i} \; x_{2_i}]^T$ is the position of the i-th actuator (see FIG. 8).

Based on the derivations and simplifying assumptions described above, the response of the entire array can be expressed as the superposition of the contributions from the various sources. This gives:

$$w(r, \theta, t) = \sum_{i=0}^{N-1} w_i(r, \theta, t) = \tag{28}$$

$$= \frac{1}{r} \sum_{i=0}^{N-1} g_i(t - \tau_i) =$$

$$= \frac{1}{r} \sum_{i=0}^{N-1} g_i\left(t - \frac{r}{c_P} - \frac{u(\theta)^T P_i}{c_P}\right)$$

The analysis is carried out in the frequency domain:

$$w(r, \theta, \omega) = \int_{-\infty}^{+\infty} w(r, \theta, t) e^{-j\omega t} dt = \tag{29}$$

$$= \frac{1}{r} \sum_{i=0}^{N-1} \int_{-\infty}^{+\infty} g(t - \tau_i) e^{-j\omega t} dt$$

Application of the Fourier Transform gives:

$$w(r, \theta, \omega) = \frac{G(\omega)}{r} \sum_{i=0}^{N-1} e^{-j\omega \tau_i} \tag{30}$$

where $$G(\omega) = \int_{-\infty}^{+\infty} g(t) e^{-j\omega t} dt$$

is the Fourier Transform of the input signal. Explicit expression of the time delay $\tau_i$ leads to the following simplifications:

$$w(r, \theta, \omega) = e^{-j\frac{\omega}{c_P}r} \frac{G(\omega)}{r} \sum_{i=0}^{N-1} e^{-j\omega \frac{u(\theta)^T P_i}{c_P}} \tag{31}$$

From equation (31) we observe that the directionality of the array is the summation term. Hence we have:

$$d(\omega, \theta) = \sum_{i=0}^{N-1} e^{-j\omega \frac{u(\theta)^T P_i}{c_P}} \tag{32}$$

Defining the vector $v(\omega,\theta)$ as:

$$v(\omega, \theta) = \begin{bmatrix} e^{-j\omega \frac{u(\theta)^T P_0}{c_P}} \\ e^{-j\omega \frac{u(\theta)^T P_1}{c_P}} \\ \vdots \\ e^{-j\omega \frac{u(\theta)^T P_{N-1}}{c_P}} \end{bmatrix}, \tag{33}$$

we can re-write the directionality of the array as:

$$d(\omega,\theta) = 1^T v(\omega,\theta) \tag{34}$$

where 1 is the unity vector N×1. The vector $v(\omega,\theta)$ incorporates all the spatial characteristics of the array and is referred to as the array manifold vector.

For a given generic planar array, equation (34) can be used to find its directionality. As an example, the case of a hexagonal array is proposed here.

Figure 9:
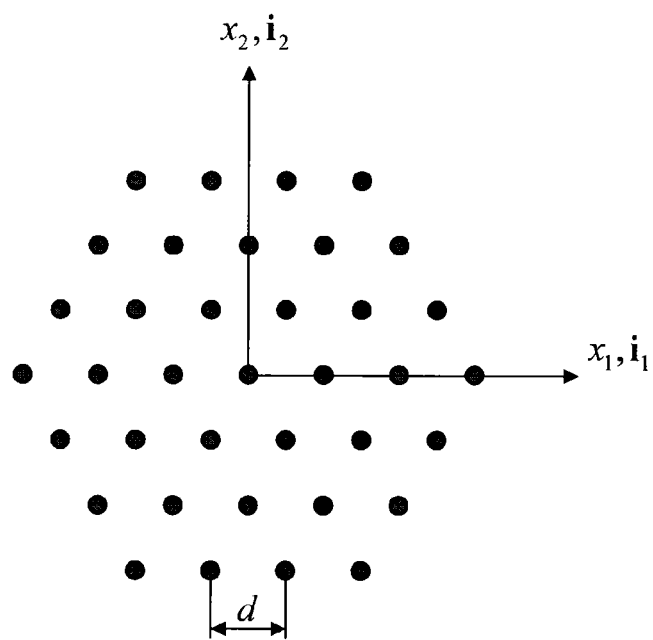
FIG. 9 is a schematic diagram depicting an exemplary embodiment of a hexagonal point source array.
Figure 10A:
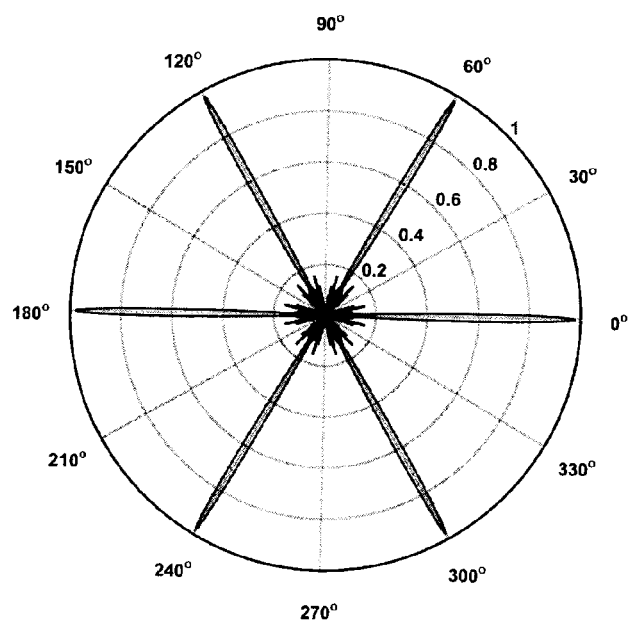
FIGS. 10A-10B are directionality plots for various values of frequencies associated with the array of FIG. 9.
Figure 10B:
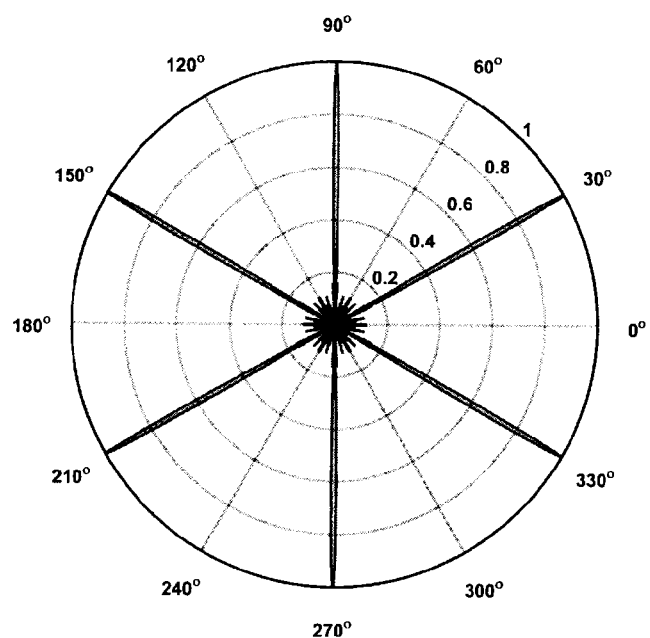

As presented by FIG. 9, an exemplary embodiment of a hexagonal point source array with N=37 actuators is used to illustrate the model. The array directivity for a given frequency is obtained directly from equation (34). Examples of directionality plots for various values of frequencies are presented in FIGS. 10A-10B. The results show how the selection of the excitation frequency can be used to obtain different directional characteristics of the array.

Figure 11:
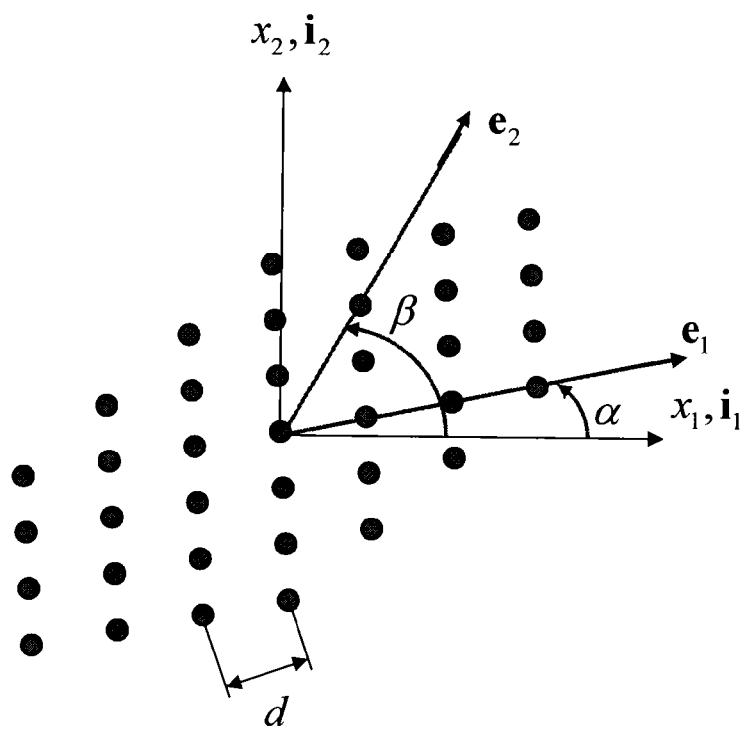
FIG. 11 is a schematic diagram depicting another exemplary embodiment of an array.
Figure 12A:
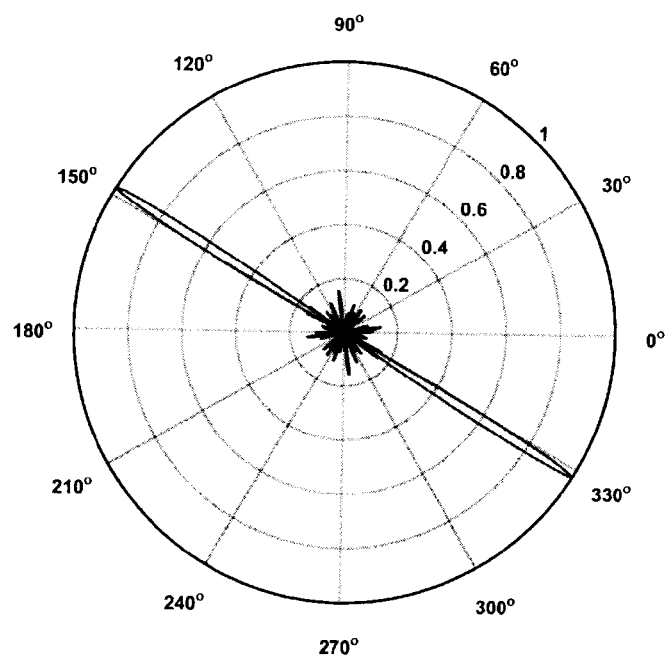
FIGS. 12A-12F are directionality plots corresponding to various frequency values illustrating the frequency-dependent directionality obtained by the embodiment of FIG. 11.
Figure 12B:
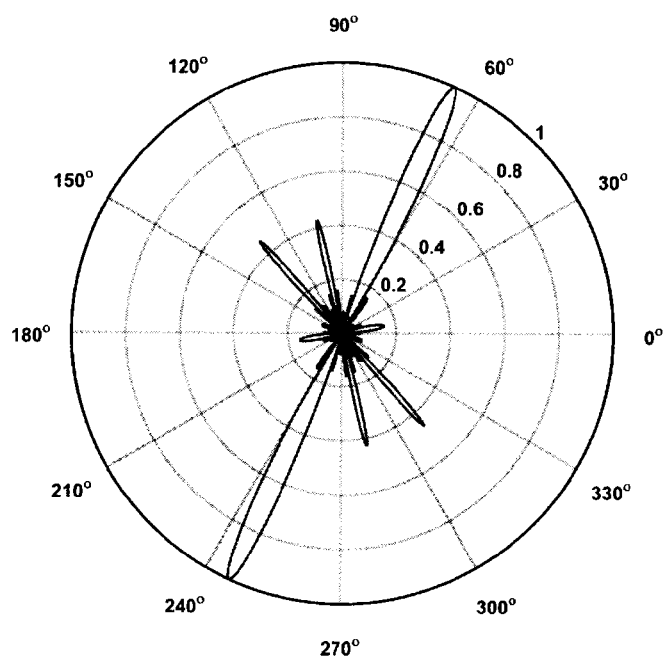
Figure 12C:
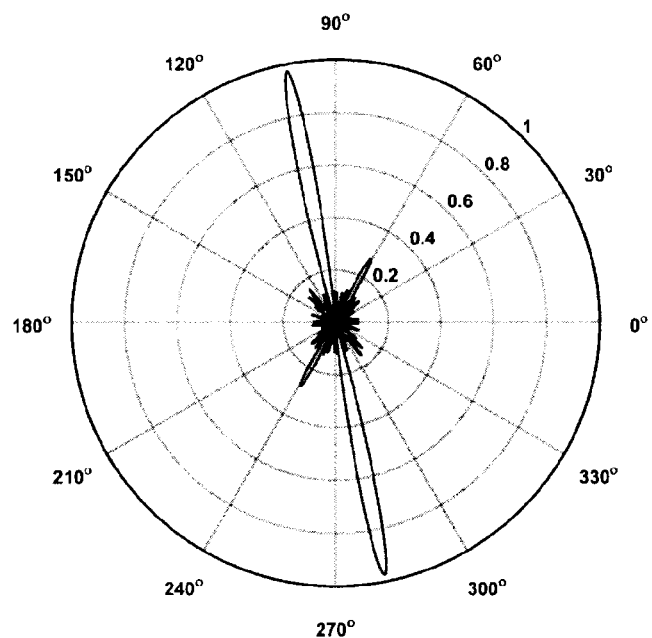
Figure 12D:
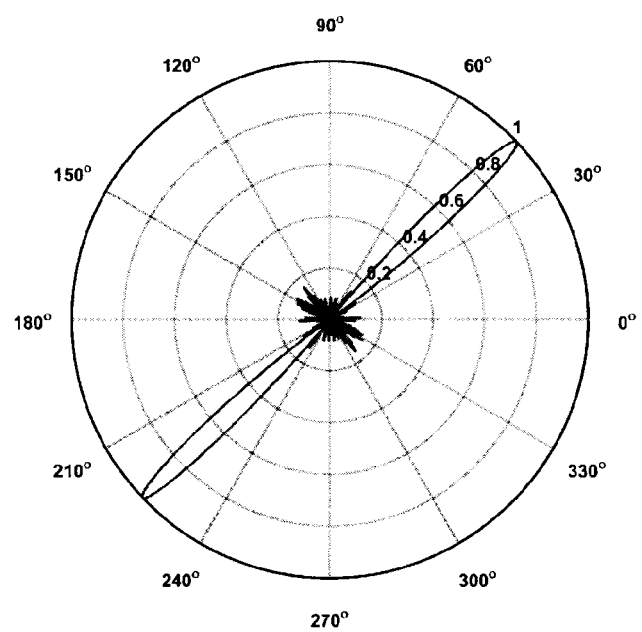
Figure 12E:
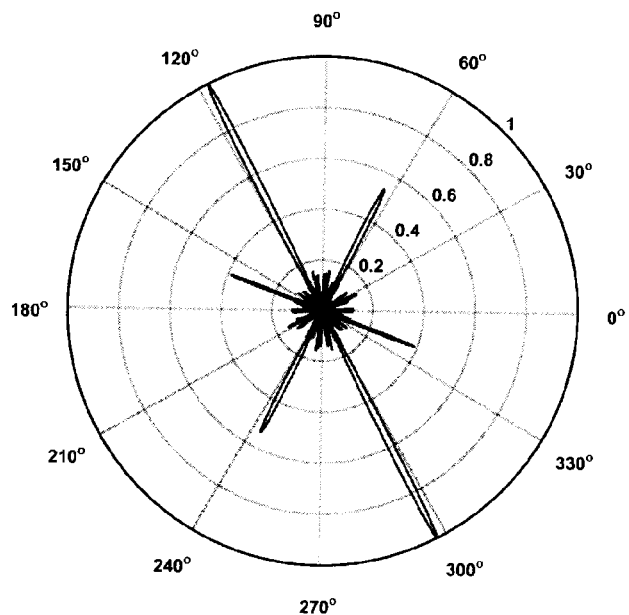
Figure 12F:
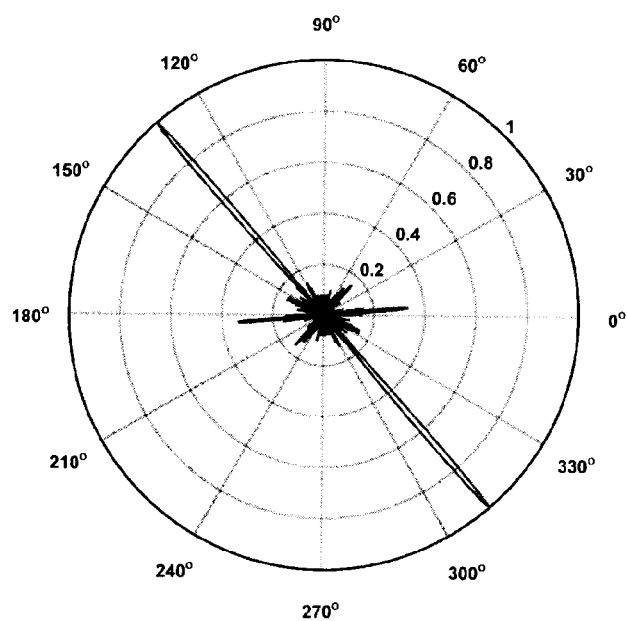

As for the rectangular array case, the basic hexagonal configuration presented above can be modified through a simple change in coordinates (FIG. 11), through which the frequency dependent directionality of the actuator can be improved.

Directionality plots corresponding to various frequency values are presented in FIGS. 12A-12F to illustrate the frequency-dependent directionality obtained through this last array topology. Of note is the fact that the considered configuration, in contrast to the basic hexagonal array design, leads to a broader set of combinations for which a single beaming angle is achieved.

The concept of utilizing 2d-periodic arrays in a sensor mode, such as for impact detection, is based on the correspondence between the array directivity angles and frequency. Provided an impact signal, the spreading out energy will be captured by surrounding arrays and show maximum response at different frequencies at different arrays according to the impact impinging angles. By correlating the array maximum response frequency with the directivity angle, one can employ two or more arrays to triangulate the impact location.

Figure 13:
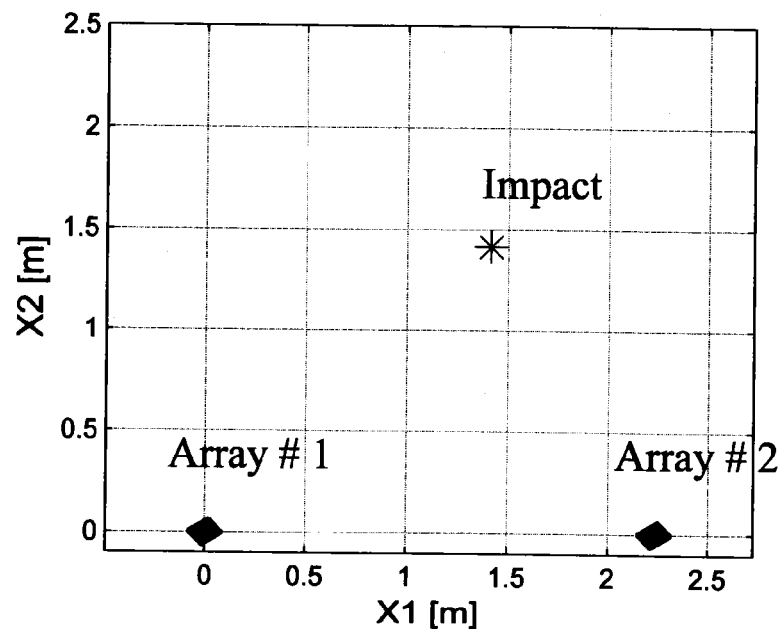
FIG. 13 depicts an exemplary embodiment of an array system incorporating two 2D-periodic arrays, each configured as the array of FIG. 1.

To validate this concept, FIG. 13 depicts an exemplary embodiment of an array system incorporating two 2D-periodic arrays with the same configuration as described with respect to FIG. 1 are employed to detect an impact.

The impact is located at 45° and 2 m away from the first array. The other array is located at −60° with respect to the impact. Thus, the impact impinging angles of these two arrays are 45° and 120°, respectively. Recall that this specific array configuration has strong directivity in 45° corresponding to 105 kHz and in 120° corresponding to 150 kHz in the actuator mode.

Figure 14:
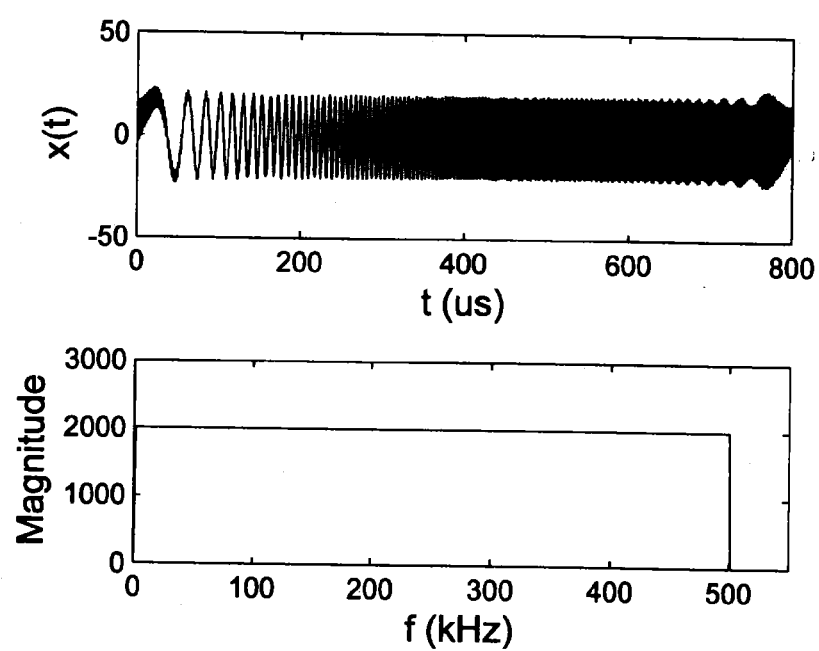
FIG. 14 depicts a simulated broadband impact signal.

Assume the impact signal is broadband ranging from DC to 500 kHz, as shown in FIG. 14. Also, assuming SV waves in membrane, the received signal by the arrays is given as:

$$U_3(\omega) = f(\omega) \sum_{n=1}^{N} \sum_{m=1}^{M} i\pi^2 H_0^{(1)}(k|r - r_{n,m}|) \quad (35)$$

where, $f(\omega)$ is the impact signal in frequency domain, n and m are the array element indices, r is the impact position vector, $r_{n,m}$ is the array element position vector, and $H_0^{(1)}$ is the Hankel function of the first kind.

Figure 15A:
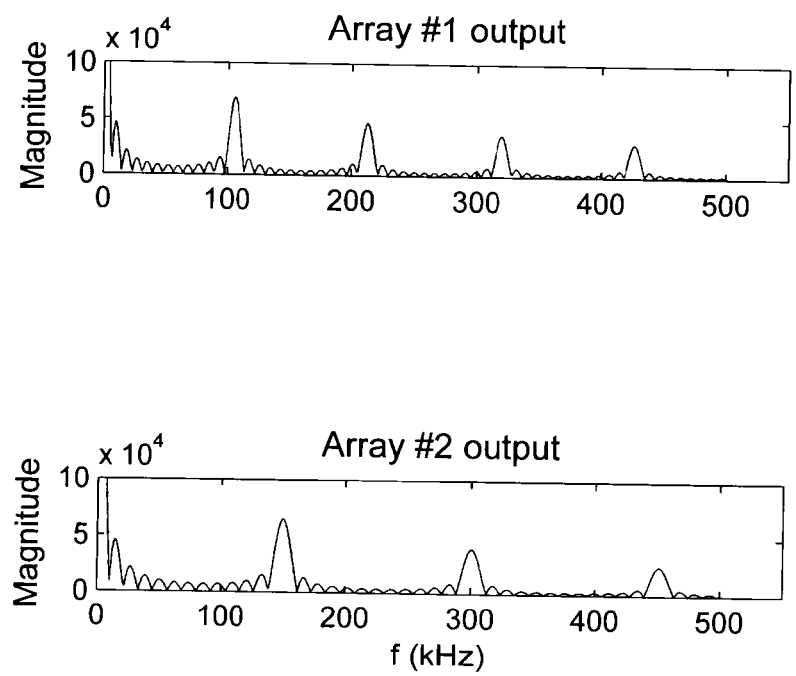
FIG. 15A depicts impact signals received by the array system of FIG. 13.
Figure 15B:
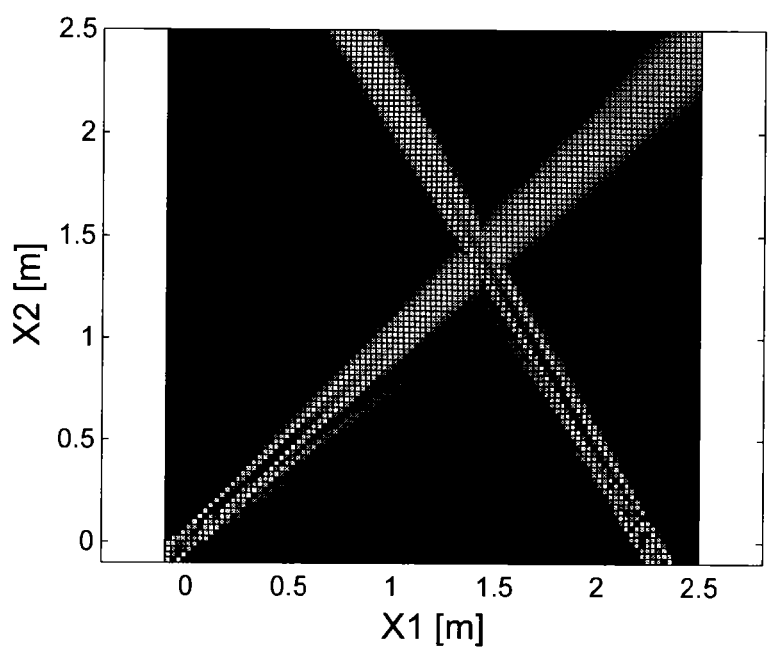
FIG. 15B depicts directivity patterns plotted to locate the impact associated with the impact signals.

FIG. 15A shows the received impact signals from both arrays in frequency domain with several peak values. The arrays function as directional space filters: the first array is sensitive to 45° impinging waves and shows peak energy at 105 kHz, while the second array is sensitive to 120° impinging waves and shows peak energy at 150 kHz. This concludes that the correspondences between the directivity angles and frequencies are still valid for the 2D-periodic array in the sensor mode. With the frequency information, the directivity patterns of both arrays can be plotted to locate the impact, as shown in FIG. 15B.

Figure 16A:
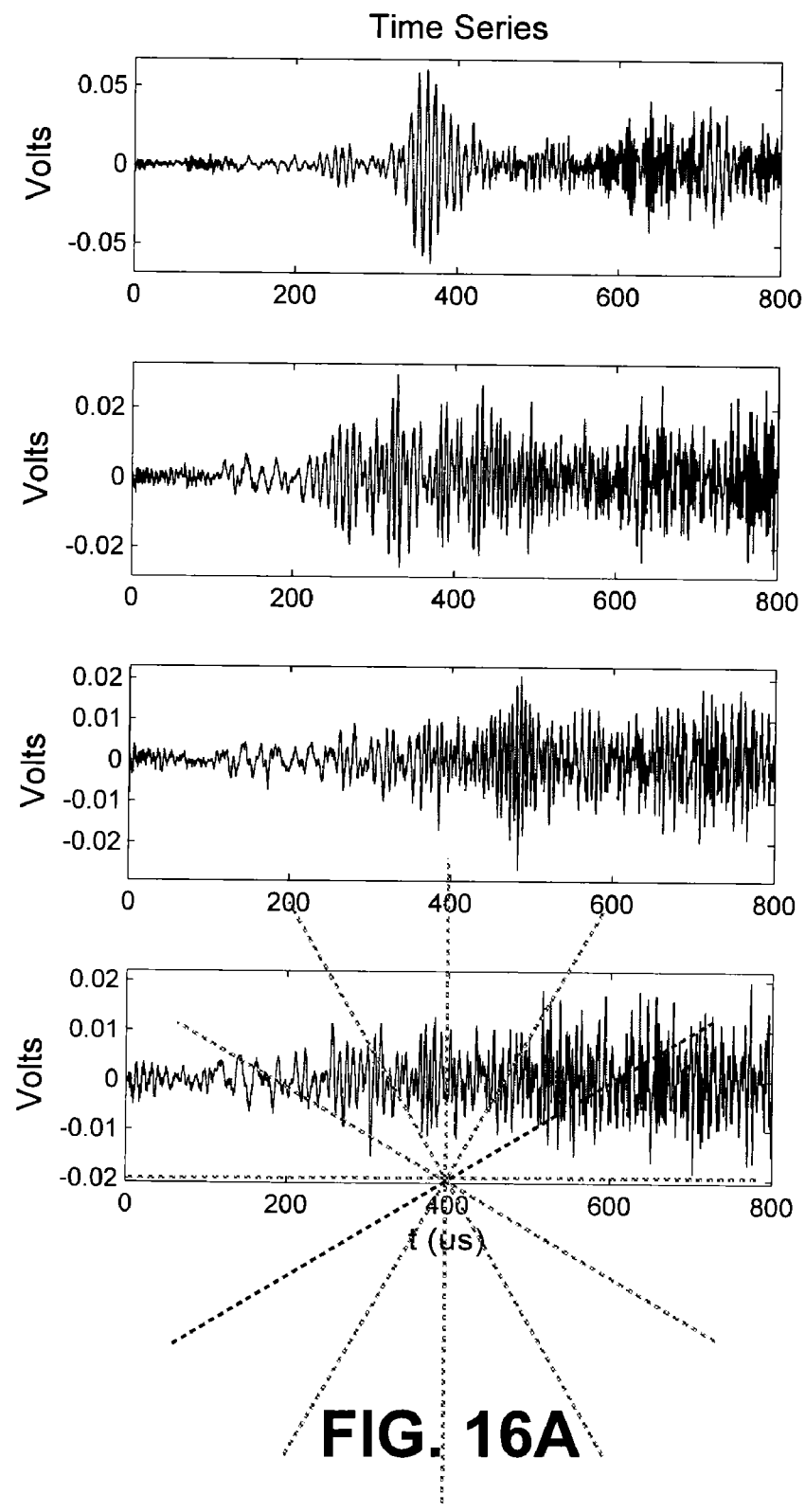
FIG. 16A depicts received impact signals from an experimental array from four directivity angles.
Figure 16B:
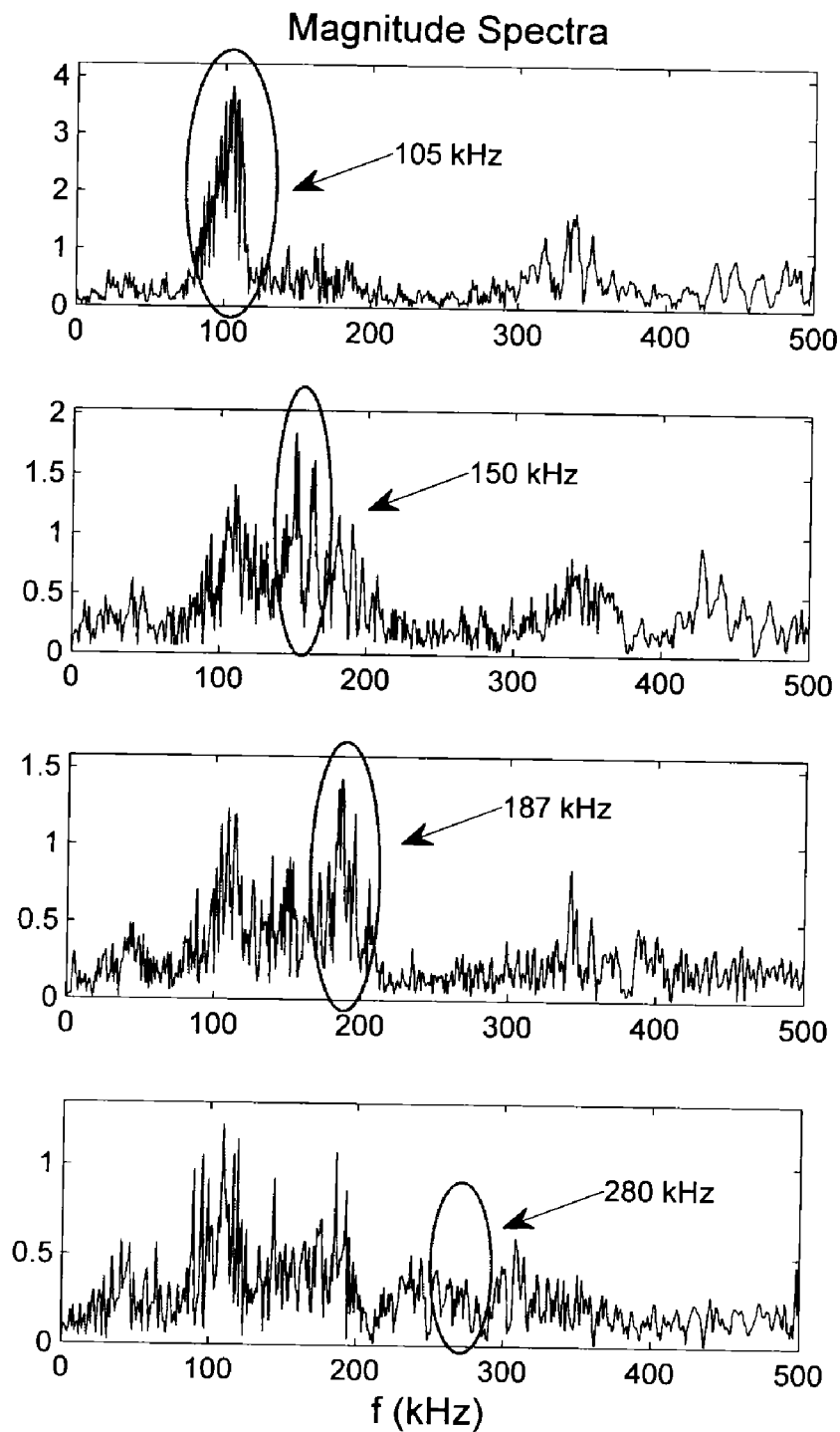
FIG. 16B depicts the signals from FIG. 16A after transformation to the frequency domain.

Experimental investigation of the array directivity in the sensor mode was conducted on a 1-mm Al plate. Four 20-mm diameter PZT transducers were mounted around the 2D periodic array at four array directivity directions (105, 150, 200, and 280 kHz directions). The distances between PZT transducers and the array center are 345 mm. Pitch-catch experiments were conducted between each PZT transducer and the array. The broadband signal shown in FIG. 14 was uploaded to a function generator and applied to each PZT transducer with 10 Vpp. The received signals from the array from four directivity angles (105 kHz, 150 kHz, 200 kHz, 280 kHz directions listed from top to bottom) were recorded by an oscilloscope (FIG. 16A) and transformed to frequency domain (FIG. 16B).

Various functionality, such as that described above with respect to the controllers (e.g., controller 114) and analyzers (e.g., analyzer 116), can be implemented in hardware and/or software. In this regard, a computing device can be used to implement this functionality in some embodiments.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. An array system for performing structural health monitoring of a component comprising:
   multiple array components exhibiting spatial periodicity;
   the array components being selectively operative in an actuator mode and a sensor mode such that:
     in the actuator mode, simultaneous activation of the array components produces waves with frequency dependent directional characteristics that propagate through the component; and
     in the sensor mode, the array components detect waves propagated through the component and filter frequency content of the waves on the basis of direction of propagation of the waves;
   a controller operative, in the actuator mode, to provide a control signal to the array components; and
   a single channel communicatively coupling the controller and the array components such that the array components produce frequency dependent directional waves responsive to the control signal provided via the single channel and the simultaneous activation of the array components.

2. The system of claim 1, wherein the array components are piezoelectric actuators.

3. The system of claim 1, wherein the controller is selectively operative, in the actuator mode, to provide the control signal to the array components to sweep the frequency of actuation of the array components such that the array components directionally scan the component.

4. The system of claim 1, wherein the first channel is the only channel used for providing the control signal to the array components.

5. The system of claim 1, further comprising an analyzer, operative in the sensor mode, to receive signals from the array components corresponding to detected waves propagated through the component.

6. The system of claim 5, wherein the analyzer is further operative to determine a location of origination of the detected waves through analysis of the frequency content.

7. The system of claim 5, wherein:
   the multiple array components are array components of a first array and of a second array; and
   the first array is spaced from the second array.

8. The system of claim 5, wherein the first array and the second array are selectively operated such that:
   the second array is operated in the sensor mode to detect waves propagated by the first array; and
   the first array is operated in the sensor mode to detect waves propagated by the second array.

9. The system of claim 1, wherein the frequency dependent directional characteristics of the array are exhibited due to wave interference.

10. The system of claim 1, wherein the array is operative to directionally scan the component by altering frequency of actuation of the array.

11. A structural health monitored system comprising:
   a component to be monitored; and
   an array system mounted to the component, the array system comprising multiple array components exhibiting spatial periodicity along at least two non-orthogonal axes, the array components being operative to produce waves with frequency dependent directional characteristics, which propagate through the component, responsive to simultaneous activation of the array components through a single channel.

12. The system of claim 11, wherein the array components are piezoelectric actuators.

13. The system of claim 11, wherein:
   the array components are operative in an actuator mode and a sensor mode such that:
     in the actuator mode, the simultaneous activation of the array components produces the waves with the frequency dependent directional characteristics; and
     in the sensor mode, the array components detect waves propagated through the component.

14. The system of claim 13, wherein:
   the system further comprises a controller operative, in the actuator mode, to provide a control signal to the array components through the single channel.

15. The system of claim 12, further comprising an analyzer, operative in the sensor mode, to receive signals from the array components corresponding to detected waves propagated through the component.

16. The system of claim 11, wherein the array components are mounted to a surface of the component.

17. A method for performing structural health monitoring of a component comprising:

simultaneously activating multiple array components exhibiting spatial periodicity along at least two non-orthogonal axes, with a control signal propagated via a single channel, to produce waves with frequency dependent directional characteristics that propagate through the component.

18. The method of claim 17, wherein, in simultaneously activating multiple array components, all of the array components are activated simultaneously.

19. The method of claim 17, wherein, in simultaneously activating multiple array components, frequency of actuation of the array components is altered such that directional scanning of the component is accomplished.

20. The method of claim 17, further comprising using the array components to detect waves propagated through the component.

* * * * *

UNITED STATES PATENT AND TRADEMARK OFFICE
CERTIFICATE OF CORRECTION

PATENT NO. : 8,286,490 B2
APPLICATION NO. : 12/638315
DATED : December 15, 2009
INVENTOR(S) : Ruzzene et al.

It is certified that error appears in the above-identified patent and that said Letters Patent is hereby corrected as shown below:

Column 4, line 58: replace " $a_3(\xi_1,\xi_2,\omega) = \blacklozenge^{-1}(\xi_1,\xi_2,\omega)\hat{f}_3(\xi_1,\xi_2,\omega)$ " with -- $\hat{u}_3(\xi_1,\xi_2,\omega) = \Delta^{-1}(\xi_1,\xi_2,\omega)\hat{f}_3(\xi_1,\xi_2,\omega)$ --

Column 4, lines 60 and 64: replace " $\blacklozenge(\xi_1,\xi_2,\omega)$ " with -- $\Delta(\xi_1,\xi_2,\omega)$ --

Column 5, line 2: replace " $\blacklozenge(\xi_1,\xi_2,\omega)$ " with -- $\Delta(\xi_1,\xi_2,\omega)$ --

Column 5, line 5: replace " $\blacklozenge(\xi_1,\xi_2,\omega)=0$ " with -- $\Delta(\xi_1,\xi_2,\omega)=0$ --

Column 5, line 8: replace " $\blacklozenge(\xi_1,\xi_2,\omega)=\xi_1^2+\xi_2^2-k^2$ " with -- $\Delta(\xi_1,\xi_2,\omega)=\xi_1^2+\xi_2^2-k^2$ --

Column 6, line 64: replace " $u_3(r,\omega)=f_0\blacklozenge(r,r_{n,m},\omega)$ " with -- $u_3(\mathbf{r},\omega)=f_0\Gamma(\mathbf{r},\mathbf{r}_{n,m},\omega)$ --

Column 6, line 67: replace " $\blacklozenge$ the Green's" with -- $\Gamma$ is the Green's --

Column 7, line 5: replace " $\blacklozenge(r,r_{n,m},\omega) = \int_{-\infty}^{+\infty}\int_{-\infty}^{+\infty} \frac{e^{-i[\xi_1(x_1-x_{1_n})+\xi_2(x_2-x_{1_m})]}}{\xi_1^2+\xi_2^2-k^2} dx_1\,dx_2$ " with -- $\Gamma(\mathbf{r},\mathbf{r}_{n,m},\omega) = \int_{-\infty}^{+\infty}\int_{-\infty}^{+\infty} \frac{e^{-i[\xi_1(x_1-x_{1_n})+\xi_2(x_2-x_{1_m})]}}{\xi_1^2+\xi_2^2-k^2} dx_1\,dx_2$ --

Signed and Sealed this
Second Day of April, 2013

Teresa Stanek Rea
*Acting Director of the United States Patent and Trademark Office*

CERTIFICATE OF CORRECTION (continued)
U.S. Pat. No. 8,286,490 B2

Column 7, line 11: replace " $\blacklozenge(r,r_{n,m},\omega)=i\pi^2 H_0^{(1)}(kR)$ " with -- $\Gamma(\mathbf{r},\mathbf{r}_{n,m},\omega) = i\pi^2 H_0^{(1)}(kR)$ --

Column 7, line 20: replace " $u_3(r,\omega) = f_0(\omega) \sum_{n=1}^{N} \sum_{m=1}^{M} \blacklozenge(r, r_{n,m}, \omega)$ " with -- $u_3(\mathbf{r},\omega) = f_0(\omega) \sum_{n=1}^{N} \sum_{m=1}^{M} \Gamma(\mathbf{r},\mathbf{r}_{n,m},\omega)$ --

Column 9, line 37: replace "generic source i" with -- generic source *i* --